US010241949B2

(12) United States Patent
Kobayashi et al.

(10) Patent No.: US 10,241,949 B2
(45) Date of Patent: Mar. 26, 2019

(54) TRANSMISSION DEVICE, DP SOURCE DEVICE, RECEPTION DEVICE, AND DP SINK DEVICE

(71) Applicant: MEGACHIPS TECHNOLOGY AMERICA CORPORATION, San Jose, CA (US)

(72) Inventors: Alan Kobayashi, Los Altos, CA (US); Ramakrishna Chilukuri, San Jose, CA (US); Sujan Thomas, Pleasanton, CA (US)

(73) Assignee: MEGACHIPS TECHNOLOGY AMERICA CORPORATION, San Jose, CA (US)

( * ) Notice: Subject to any disclaimer, the term of this patent is extended or adjusted under 35 U.S.C. 154(b) by 0 days.

(21) Appl. No.: 15/643,517

(22) Filed: Jul. 7, 2017

(65) Prior Publication Data

US 2017/0308493 A1    Oct. 26, 2017

Related U.S. Application Data

(63) Continuation of application No. PCT/US2016/012416, filed on Jan. 7, 2016.

(60) Provisional application No. 62/101,192, filed on Jan. 8, 2015, provisional application No. 62/105,354, filed on Jan. 20, 2015.

(51) Int. Cl.
*G06F 13/38* (2006.01)
*G06F 13/42* (2006.01)

(52) U.S. Cl.
CPC ........ *G06F 13/385* (2013.01); *G06F 13/4282* (2013.01)

(58) Field of Classification Search
CPC .......................... G06F 13/385; G06F 13/4282
See application file for complete search history.

(56) References Cited

U.S. PATENT DOCUMENTS

| 8,583,841 B2* | 11/2013 | Zeng ..................... H03L 7/0807 710/21 |
| 2009/0175397 A1 | 7/2009 | Lee et al. |
| 2010/0037283 A1* | 2/2010 | Zhu ......................... G06F 3/14 725/135 |
| 2010/0185792 A1 | 7/2010 | Yao et al. |
| 2011/0267116 A1 | 11/2011 | Yang et al. |
| 2012/0203937 A1 | 8/2012 | Mohanty et al. |
| 2015/0363350 A1* | 12/2015 | Yeung ................ G06F 13/4221 710/106 |

FOREIGN PATENT DOCUMENTS

WO    WO 2015/153561 A1    10/2015

OTHER PUBLICATIONS

Video Electronics Standards Association. "VESA DisplayPort Standard", Jan. 1, 2008. Version 1, Revision 1 a. pp. 1, 11-70, 121-159.*

(Continued)

*Primary Examiner* — Hyun Nam
*Assistant Examiner* — John B Roche
(74) *Attorney, Agent, or Firm* — Xsensus LLP

(57) ABSTRACT

A transmission device includes a converter and a transmitter. The converter converts a plurality of link symbols in DisplayPort (DP) into a data block in Gen 2 in Universal Serial Bus (USB). The transmitter transmits the data block.

8 Claims, 15 Drawing Sheets

(56) References Cited

OTHER PUBLICATIONS

Hewlett Packard Company et al. "Universal Serial Bus 3.1 Specification", Jul. 26, 2013. Revision 1.0. Front Cover, pp. 1-2, 6-8.*
Hewlett Packard Company et al. "Universal Serial Bus 3.1 Specification", Jul. 26, 2013. Revision 1.0. pp. 8-104 (Year: 2013).*
VESA Display Port (DP) Standard Version t3, Sep. 17, 2014, 754 pages, Video Electronics Standards Association.
Universal Serial Bus 3.1 Specification Revision 1.0, Jul. 26, 2013, 631 pages.
VESA Display Port Alt Mode on USB Type-C Standard Version 1.0, Sep. 22, 2014, 114 pages, Video Electronics Standards Association.
VESA Coordinated Video Timing (CVT) Standard Version 1.2, Feb. 8, 2013, 26 pages, Video Electronics Standards Association.
VESA Display Port Standard, Version 1, Revision 1a, Jan. 11, 2008, pp. 1. 11-70 and 121-159, Video Electronics Standards Association.
International Search Report issued in PCT/US2016/012416, date of completion Mar. 1, 2016, 4 pages.
Written Opinion of the International Search Authority issued in PCT/US2016/012416 , date of completion Mar. 1, 2016, 6 pages.
Office Action issued in Japanese Application 2017-531718 dated Aug. 7, 2018.
VESA Video Electronics Standards Association, "VESA DisplayPort Standard", Version 1, Revision 1a, 238 Pages total, (Jan. 11, 2008).

* cited by examiner

F I G. 1
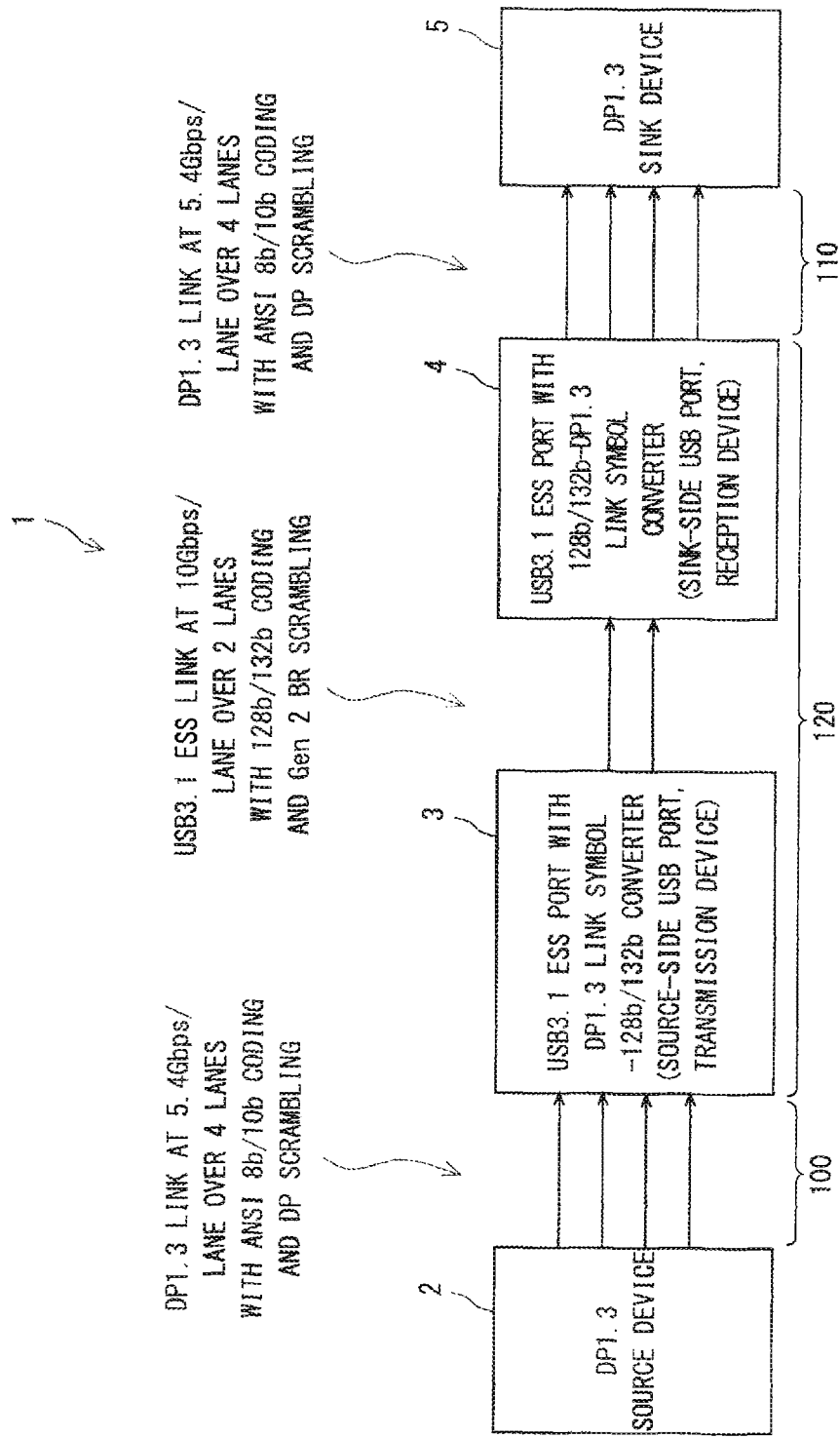

F I G. 5
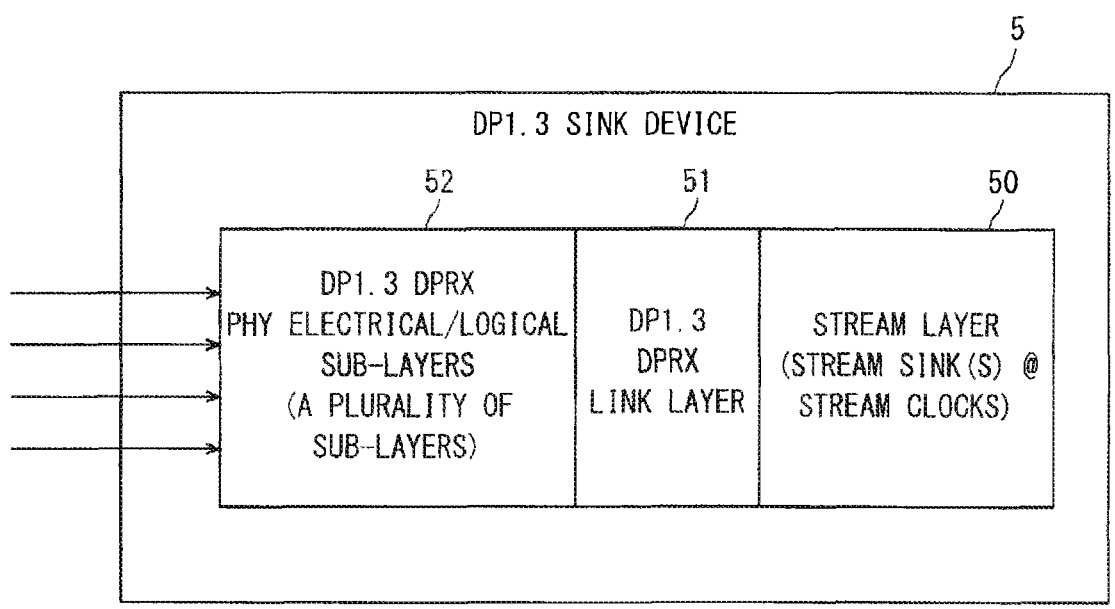

F I G. 1 3
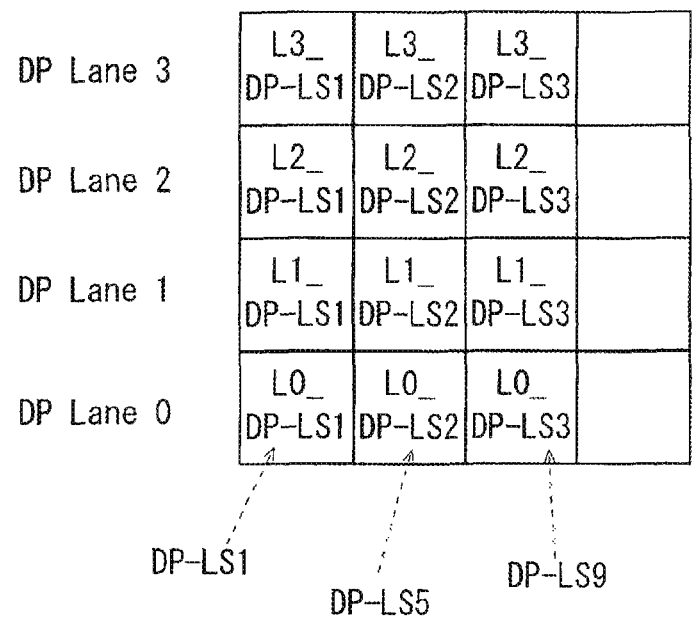

F I G. 1 4

| | | | | |
|---|---|---|---|---|
| DP Lane 1 | L1_DP-LS1 | L1_DP-LS2 | L1_DP-LS3 | |
| DP Lane 0 | L0_DP-LS1 | L0_DP-LS2 | L0_DP-LS3 | |

DP-LS1　　DP-LS3　　DP-LS5

| | | | | |
|---|---|---|---|---|
| Gen 2 BR Lane 1 | DP-LS2 | DP-LS4 | DP-LS6 | |
| Gen 2 BR Lane 0 | DP-LS1 | DP-LS3 | DP-LS5 | |

FIG. 15
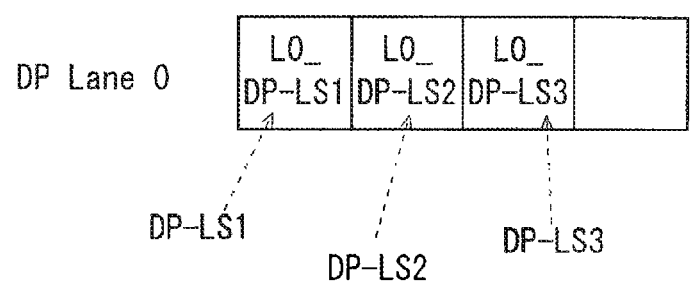
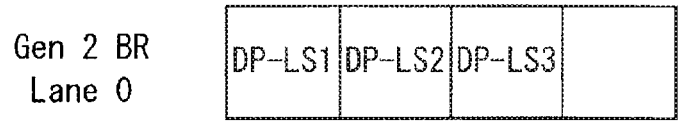

TRANSMISSION DEVICE, DP SOURCE DEVICE, RECEPTION DEVICE, AND DP SINK DEVICE

CROSS-REFERENCE TO RELATED APPLICATIONS

The present application is a continuation of International Application No. PCT/US2016/012416, filed Jan. 7, 2016, which claims the benefit of priority to U.S. Provisional Application Ser. No. 62/101,192, filed Jan. 8, 2015 and U.S. Provisional Application Ser. No. 62/105,354, filed Jan. 20, 2015; the entire contents of each of which are incorporated herein by reference.

TECHNICAL FIELD

The present invention relates to DisplayPort (DP) and Universal Serial Bus (USB).

BACKGROUND ART

Non-Patent Documents 1 and 3 disclose the technology related to DP. Non-Patent Document 2 discloses the technology related to USB. Non-Patent Document 4 discloses the technology related to display timing.

PRIOR ART DOCUMENTS

Non-Patent Documents

Non-Patent Document 1: VESA DisplayPort (DP) Standard Version 1.3, 2014 Sep. 17
Non-Patent Document 2: Universal Serial Bus 3.1 Specification Revision 1.0, 2013 Jul. 26
Non-Patent Document 3: VESA DisplayPort Alt Mode on USB Type-C Standard Version 1.0, 2014 Sep. 22
Non-Patent Document 4: VESA Coordinated Video Timing (CVT) Standard Version 1.2, 2013 Feb. 8

SUMMARY OF INVENTION

Problem to be Solved by the Invention

Link symbols in DP are desired to be communicated over a USB link with a simple configuration.

The present invention has an object to provide technology enabling the communication of link symbols in DP over a USB link with a simple configuration.

Means for Solving the Problem

According to one aspect of the present invention, a transmission device includes a converter and a transmitter. The converter converts a plurality of link symbols in DisplayPort (DP) into a data block in Gen 2 in Universal Serial Bus (USB). The transmitter transmits the data block.

According to one aspect of the present invention, a DP source device includes a mapper, a converter, and a transmitter. The mapper maps stream data to a plurality of link symbols in DisplayPort (DP). The converter converts the plurality of link symbols obtained in the mapper into a data block in Gen 2 in Universal Serial Bus (USB). The transmitter transmits the data block.

According to one aspect of the present invention, a reception device includes a receiver and a converter. The receiver receives a data block obtained as a data block in Gen 2 in Universal Serial Bus (USB) by conversion from a plurality of link symbols in DisplayPort (DP). The converter converts the data block received by the receiver into the plurality of link symbols.

According to one aspect of the present invention, a DP sink device includes a receiver, a converter, and a mapper. The receiver receives a data block obtained as a data block in Gen 2 in Universal Serial Bus (USB) by conversion from a plurality of link symbols in DisplayPort (DP). The converter converts the data block received by the receiver into the plurality of link symbols. The mapper maps the plurality of link symbols obtained by the converter to stream data.

Effects of the Invention

Link symbols in DP can be communicated over a USB link with a simple configuration.

BRIEF DESCRIPTION OF DRAWINGS

FIG. 1 illustrates the configuration of an image display system.
FIG. 5 illustrates the configuration of a DP sink device.
FIG. 13 illustrates the relationship between DP Link Symbols transported over DP Main Links and DP Link Symbols transported over Gen2 BR PHY link.
FIG. 14 illustrates the relationship between DP Link Symbols transported over DP Main Links and DP Link Symbols transported over Gen2 BR PHY link.
FIG. 15 illustrates the relationship between DP Link Symbols transported over DP Main Links and DP Link Symbols transported over Gen2 BR PHY link.

DESCRIPTION OF EMBODIMENTS

Figure 2:
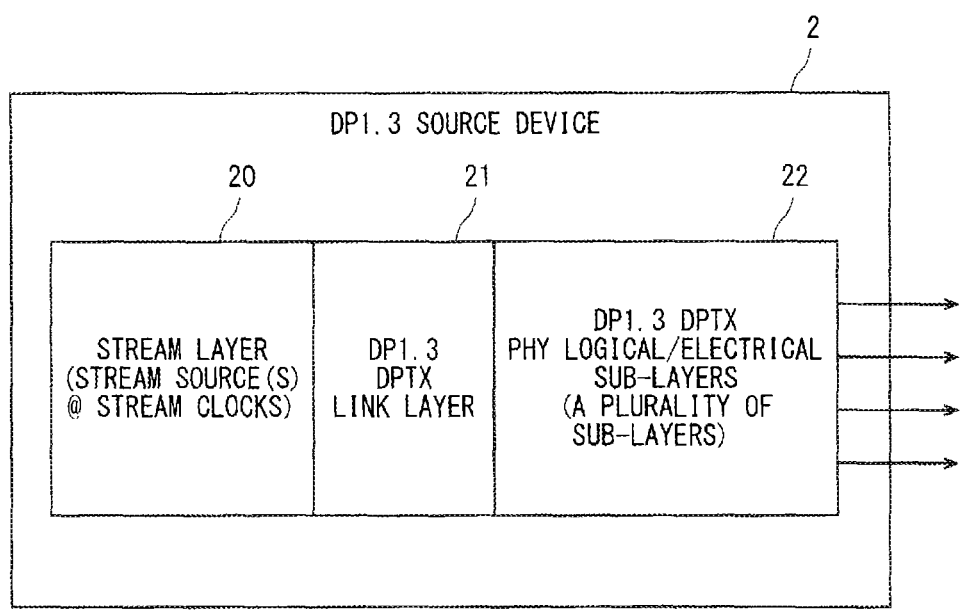
FIG. 2 illustrates the configuration of a DP source device.

In the description below, Non-Patent Document 1 above may be referred to as DP Standard Version 1.3, and Non-Patent Document 2 may be referred to as USB3.1 Specification Revision 1.0.

As described in DP Standard Version 1.3, DP converts AV stream data into 9-bit DP Link Symbols consisting of an 8-bit value and a Control/Data Link Symbol identification bit. The 9-bit DP Link Symbols are encoded into ANSI 8b/10b codes; Data Link Symbols (Data Symbols) are encoded into ANSI 8b/10b Data Character Symbol Codes and Control Link Symbols (Control Symbols) into ANSI 8b/10b Special Character Symbol Codes (also known as ANSI 8b/10b K codes).

Meanwhile, as described in USB3.1 Specification Revision 1.0, a 128b/132b-coded USB3.1 ESS (Enhanced SuperSpeed) Gen2 BR (Generation 2 Bit Rate) PHY layer transmits serialized 132-bit blocks that are either Control Blocks or Data Blocks, as distinguished with 4-bit Block Header. Each block consists of 4-bit Block Header and sixteen of 8-bit symbols.

Each end of the USB3.1 ESS link operates with its own reference clock that can be off of the reference clock on the other end of the link by as much as 600 ppm. To accommodate this difference in reference clock frequencies on two ends, the USB3.1 ESS transmission device is required to periodically transmit Control Blocks containing SKP/SKPEND (i.e., skip/skip-end) Ordered Set symbols. Besides, a periodic transmission of Control Blocks containing SYNC Ordered Set symbols is required to keep the LSFR's of scrambler (on the transmitting end) and de-scrambler (on the receiving end) in synchronization. In DP Standard Version 1.3, DPTX (DisplayPort transmitter) does not transmit skip symbols as DPRX (DisplayPort receiver) is required to reproduce the link clock from the incoming ANSI 8b/10b-coded serial bit stream.

As defined in Non-Patent Document 3, concurrent support of DP and USB3.1 ESS on a single connector, or USB Type-C connector, repurposes some of the connector pins either for the USB3.1 ESS PHY layer as defined in USB3.1 Specification Revision 1.0 or the DP PHY layer in DP Standard Version 1.3. For example, all the four high-speed differential pairs (differential terminals) of the USB Type-C connector are used for 4-lane DP Main Link, or two high-speed differential pairs (differential terminals) are used for USB3.1 ESS and the remaining two high-speed differential pairs (differential terminals) are used for 2-lane DP Main Link. In the method defined in Non-Patent Document 3, the USB3.1 ESS PHY layer does not transport DP Link Symbols, and accordingly, DP protocol is not tunneled over the USB3.1 ESS PHY layer.

For example, this embodiment enables the tunneling of DP protocol, defined in DP Standard Version 1.3, over the 128b/132b-coded USB3.1 ESS Gen 2 BR PHY layer defined in USB3.1 Specification Revision 1.0. In this embodiment, the 9-bit DP Link Symbols, each consisting of an 8-bit value and a Control/Data Link Symbol identification bit, are packed and transmitted in 132-bit Data Blocks that are periodically interspersed with 132-bit Control Blocks for USB3.1 ESS link management, thus enabling the DP protocol tunneling over USB3.1 ESS link without modification to the link management and Gen 2 BR PHY layer of USB3.1 ports and to DP1.3 Link Layers. This embodiment will be described below in detail.

Configuration of Image Display System

FIG. 1 illustrates the configuration of an image display system 1 according to an embodiment. As illustrated in FIG. 1, the image display system 1 includes a DP1.3 source device 2, a USB3.1 ESS port 3 with a DP1.3 link symbol-128b/132b converter, a USB3.1 ESS port 4 with a 128b/132b-DP1.3 link symbol converter, and a DP1.3 sink device 5.

Hereinafter, the DP1.3 source device 2 may be referred to as a "DP source device 2," and the DP1.3 sink device 5 may be referred to as a "DP sink device 5." The USB3.1 ESS port 3 may be referred to as a "source-side USB port 3," and the USB3.1 ESS port 4 may be referred to as a "sink-side USB port 4."

Each of the DP source device 2 and the DP sink device 5 is compliant with DP Standard Version 1.3. Each of the source-side USB port 3 and the sink-side USB port 4 is compliant with USB3.1 Specification Revision 1.0. The DP source device 2, the source-side USB port 3, the sink-side USB port 4, and the DP sink device 5 are separate from each other.

A DP1.3 link 100 that is the main link connecting the DP source device 2 and the source-side USB port 3 consists of one, two, or four lanes. In the example of FIG. 1, the DP link 100 consists of four lanes. In this embodiment, the transport rate of the DP1.3 link 100 is, for example, 5.4 Gbps per lane.

A DP1.3 link 110 that is the main link connecting the DP sink device 5 and the sink-side USB port 4 consists of one, two, or four lanes. In the example of FIG. 1, the DP link 110 consists of four lanes. The transport rate of each lane is, for example, 5.4 Gbps.

The source-side USB port 3, the sink-side USB port 4, and the connection between these ports constitute a USB3.1 ESS link 120. The USB3.1 ESS link 120 includes two lanes connecting the source-side USB port 3 and the sink-side USB port 4. In this embodiment, the transport rate of each lane is, for example, 10 Gbps (Gen 2). The DP source device 2 and the DP sink device 5 are connected via the USB3.1 ESS link 120 including the source-side USB port 3 and the sink-side USB port 4.

In the image display system 1, AV stream data generated by the DP source device 2 is input to the DP sink device 5 via the source-side USB port 3 and the sink-side USB port 4. Then, the DP sink device 5 reproduces the input AV stream data. As a result, the image generated by the DP source device 2 is displayed in the DP sink device 5. The source-side USB port 3 is one type of transmission device, and the sink-side USB port 4 is one type of reception device.

Configuration of DP Source Device

FIG. 2 illustrates the configuration of the DP source device 2. As illustrated in FIG. 2, the DP source device 2 includes a stream layer 20, a DP1.3 DPTX link layer 21 (hereinafter, also referred to as a "DPTX link layer 21"), and a DP1.3 DPTX PHY logical/electrical sub-layer 22 (hereinafter, also referred to as a "DPTX PHY sub-layer 22"). The DPTX PHY sub-layer 22 consists of a plurality of sub-layers.

The stream layer 20 generates AV stream data that is a stream source based on a stream clock. The DPTX link layer 21 maps the AV stream data generated in the stream layer 20 to DP Link Symbols. In other words, the DPTX link layer 21 converts the AV stream data into DP Link Symbols. The DPTX link layer 21 functions as a mapper (mapping circuit) that maps stream data to a DP link. The DP Link Symbol consists of an 8-bit value (8-bit data) and a Control/Data Link Symbol identification bit. A Control/Data Link Symbol identification bit is 1 bit. The DP Link Symbol accordingly consists of 9 bits. The Control/Data Link Symbol identification bit is a bit for identifying whether the DP Link Symbol containing this bit is a control symbol or a data symbol.

The DPTX PHY sub-layer 22 scrambles the DP Link Symbols generated by the DPTX link layer 21 and then encodes the DP Link Symbols into ANSI 8b/10b codes. Then, the DPTX PHY sub-layer 22 transmits the encoded DP Link Symbols to the source-side USB port 3. As a result, the DP Link Symbols scrambled and encoded with ANSI 8b/10b are transported from the source device 2 to the source-side USB port 3.

Configuration of Source-Side USB Port

Figure 3:
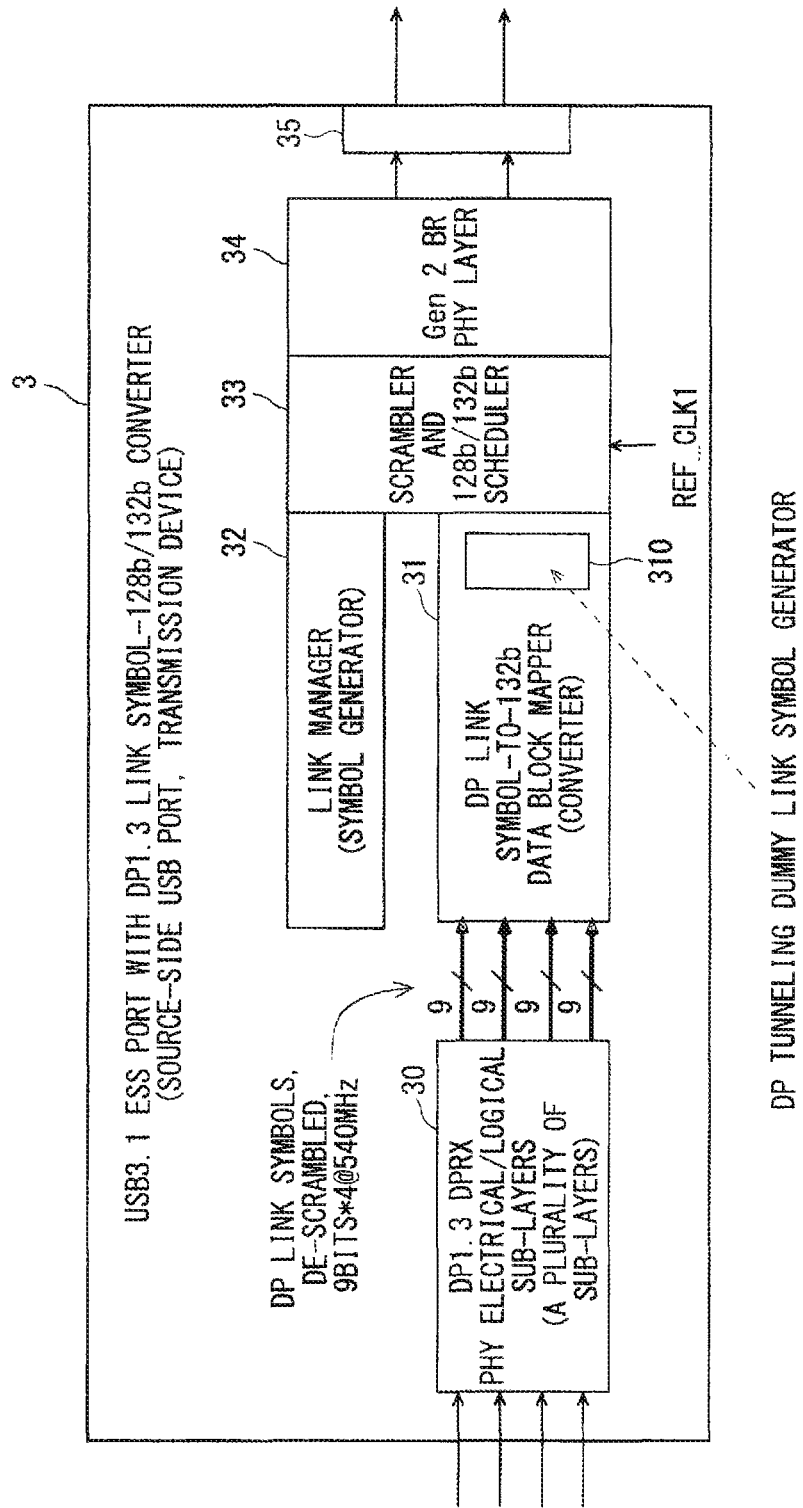
FIG. 3 illustrates the configuration of a source-side USB port.

FIG. 3 illustrates the configuration of the source-side USB port 3. As illustrated in FIG. 3, the source-side USB port 3 includes a DP1.3 DPRX PHY electrical/logical sub-layer 30 (hereinafter, also referred to as a "DPRX PHY sub-layer 30"), a DP link symbol-to-132b data block mapper 31 (hereinafter, also referred to as a "mapper 31"), a link manager 32, a scrambler and 128b/132b scheduler 33, a Gen 2 BR PHY layer 34, and a connector 35. The DPRX PHY sub-layer 30 consists of a plurality of sub-layers. The source-side USB port 3 and the source device 2 are connected via, for example, a cable. The DPRX PHY sub-layer 30 decodes the DP Link Symbols from the source device 2 as per ANSI 8b/10b, and then, de-scrambles the decoded DP Link Symbols. The DPRX PHY sub-layer 30 outputs the de-scrambled DP Link Symbols to the mapper 31. The DPRX PHY sub-layer 30 and the mapper 31 are connected via four lanes, and 9-bit parallel data is transported at 540 MHz in each lane.

The mapper 31 converts the DP Link Symbols from the DPRX PHY sub-layer 30 into a 132-bit data block of USB3.1 ESS Gen 2 BR. The mapper 31 thus functions as a converter (conversion circuit) that converts DP Link Symbols into a data block in Gen 2 in USB. The mapper 31 includes a DP tunneling dummy link symbol generator 310 (hereinafter, also referred to as a "generator 310"). The generator 310 generates DP tunneling dummy link symbols described below. The mapper 31 is a DP1.3 link symbol-128b/132b converter.

The link manager 32 performs link management of the USB3.1 ESS link 120. The link manager 32 generates 132-bit Control Blocks for link management of USB3.1 ESS link 120, such as SKP Ordered Set and SYNC Ordered Set. The SKP Ordered Set contains SKP symbols and SKPEND symbols. The link manager 32 functions as a symbol generator that generates special symbols such as SKP symbols and SKPEND symbols.

The scrambler and 128b/132b scheduler 33 scrambles, with a scrambler, the data blocks obtained in the mapper 31 and the control blocks obtained in the link manager 32. The scrambler and 128b/132b scheduler 33 also schedules the transmissions of the data blocks and the control blocks with a 128b/132b scheduler. The scrambler and 128b/132b scheduler 33 operates based on a first reference clock REF_CLK1. The first reference clock REF_CLK1 is generated by a reference clock generation circuit (not shown) provided in the sink-side USB port 4. The scrambler is, for example, a circuit configured by a Linear Feedback Shift Register (LFSR).

The Gen 2 BR PHY layer 34 transmits the data blocks obtained by the mapper 31 and the control blocks obtained by the link manager 32 to the sink-side USB port 4 via the connector 35 in the order determined by the scrambler and 128b/132b scheduler 33. In transmitting 132-bit blocks such as control blocks and data blocks, the Gen 2 BR PHY layer 34 converts the 132-bit blocks from parallel data into serial data and differentially transmits the 132-bit blocks of serial data. The connector 35 is a USB Type-C connector. The source-side USB port 3 transmits data using two high-speed differential pairs (differential terminals) of four high-speed differential pairs (differential terminals) of the connector 35 that is a USB Type-C connector. The Gen 2 BR PHY layer 34 functions as a transmitter (transmission circuit) that transmits 132-bit blocks.

Each of the Data Blocks and the Control Blocks consists of 4-bit Brock Header (block identifier) and sixteen of symbols. One symbol consists of 8 bits.

Configuration of Sink-Side USB Port

Figure 4:
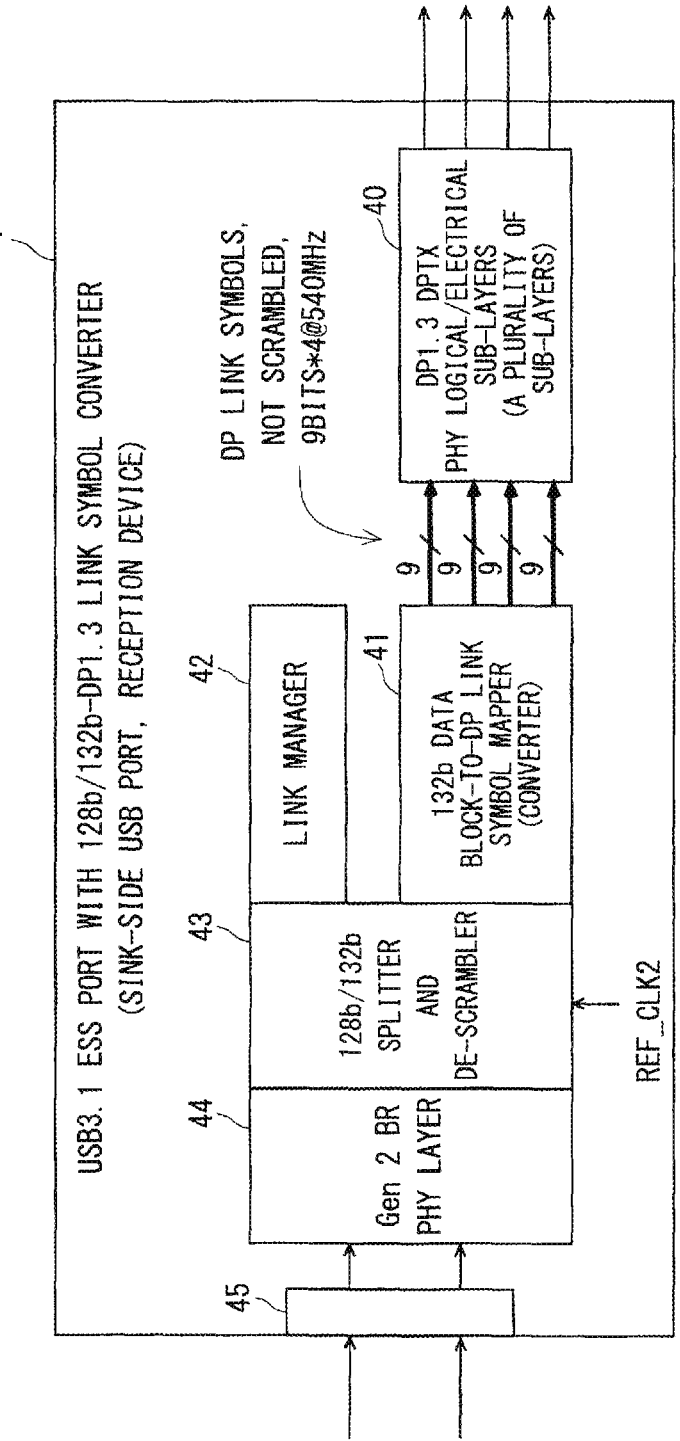
FIG. 4 illustrates the configuration of a sink-side USB port.

FIG. 4 illustrates the configuration of the sink-side USB port 4. As illustrated in FIG. 4, the sink-side USB port 4 includes a DP1.3 DPTX PHY logical/physical sub-layer 40 (hereinafter, also referred to as a "DPTX PHY sub-layer 40"), a 132b data block-to-DP link symbol mapper 41 (hereinafter, also referred to as a "mapper 41"), a link manager 42, a 128b/132b splitter and de-scrambler 43, a Gen 2 BR PHY layer 44, and a connector 45. The DPTX PHY sub-layer 40 consists of a plurality of sub-layers.

The Gen 2 BR PHY layer 44 differentially receives 132-bit blocks transmitted from the source-side USB port 3 via the connector 45. The connector 45 is a USB Type-C connector. The sink-side USB port 4 receives data using two high-speed differential pairs (differential terminals) of four high-speed differential pairs (differential terminals) of the connector 45 that is a USB Type-C connector. The Gen 2 BR PHY layer 44 functions as a receiver (reception circuit) that receives 132-bit blocks. The Gen 2 BR PHY layer 44 converts the received 132-bit blocks from serial data into parallel data, and then outputs the 132-bit blocks of parallel data to the 128b/132b splitter and de-scrambler 43. The connector 45 of the sink-side USB port 4 and the connector 35 of the source-side USB port 3 are connected via the USB Type-C connector.

The 128b/132b splitter and de-scrambler 43 divides a plurality of 132-bit blocks from the Gen 2 BR PHY layer 44 into data blocks and control blocks with a 128b/132b splitter. Then, the 128b/132b splitter and de-scrambler 43 individually de-scrambles the data blocks and the control blocks with a de-scrambler. The 128b/132b splitter and de-scrambler 43 outputs the de-scrambled data blocks to the mapper 41 and outputs the de-scrambled control blocks to the link manager 42. The 128b/132b splitter and de-scrambler 43 operates based on a second reference clock REF_CLK2. The second reference clock REF_CLK2 is generated in a reference clock generation circuit (not shown) provided in the sink-side USB port 4. The de-scrambler is, for example, a circuit configured by a Linear Feedback Shift Register (LFSR). SYNC Ordered Set transmitted by the source-side USB port 3 is the data for resetting the LFSR of the de-scrambler.

Herein, the source-side USB port 3 and the sink-side USB port 4 operate respectively based on the independent first reference clock REF_CLK1 and second reference clock REF_CLK2. In USB3.1 Specification Revision 1.0, the accuracy of the frequency of each of the first reference clock REF_CLK1 and the second reference clock REF_CLK2 requires ±300 ppm. Thus, the difference between the frequency of the first reference clock REF_CLK1 and the frequency of the second reference clock REF_CLK2 is up to 600 ppm. To compensate for the difference in frequency between the first reference clock REF_CLK1 and the second reference clock REF_CLK2, the source-side USB port 3 periodically transmits SKP Ordered Set.

The mapper 41 converts the data blocks from the 128b/132b splitter and the de-scrambler 43 into a plurality of DP Link Symbols. The mapper 41 thus functions as a converter (conversion circuit) that converts the Gen 2 data block in USB into a plurality of DP Link Symbols. The mapper 41 is a 128b/132b-DP1.3 link symbol converter.

The link manager 42 performs link management of the USB3.1 ESS link 120 based on the control blocks from the 128b/132b splitter and the de-scrambler 43.

The DPTX PHY sub-layer 40 scrambles the DP Link Symbols generated in the mapper 41 as with the DPTX PHY sub-layer 22 of the DP source device 2, and then, encodes the DP Link Symbols into ANSI 8b/10b codes. Then, the DPTX PHY sub-layer 40 transmits the encoded DP Link Symbols to the DP sink device 5. As a result, the sink-side USB port 4 transports the DP Link Symbols that have been scrambled and encoded at ANSI 8b/10b to the DP sink device 5. The DPTX PHY sub-layer 40 and the mapper 41 are connected via four lanes, and each lane transports 9-bit parallel data at 540 MHz.

Configuration of DP Sink Device

FIG. 5 illustrates the configuration of the DP sink device 5. As illustrated in FIG. 5, the DP sink device 5 includes a stream layer 50, a DP1.3 DPRX link layer 51 (hereinafter, also referred to as a "DPRX link layer 51"), and a DP1.3 DPRX PHY electrical/logical sub-layer 52 (hereinafter, also referred to as a "DPRX PHY sub-layer 52"). The DPRX PHY sub-layer 52 consists of a plurality of sub-layers. The DP sink device 5 and the sink-side USB port 4 are connected via, for example, a cable.

The DPRX PHY sub-layer 52 decodes the DP Link Symbols from the sink-side USB port 4 as per ANSI 8b/10b and then de-scrambles the DP Link Symbols, as with the DPRX PHY sub-layer 30 of the source-side USB port 3.

The DPRX link layer 51 maps the DP Link Symbols de-scrambled by the DPRX PHY sub-layer 52 to stream data. In other words, the DPRX link layer 51 converts the DP Link Symbols into stream data. The DPRX link layer 51 functions as a mapper (mapping circuit) that maps DP Link Symbols to stream data.

The stream layer 50 reproduces original AV stream data from the stream data obtained in the DPRX link layer 51. The stream layer 50 further reproduces a stream clock. In the DP sink device 5, a video is displayed based on the reproduced AV stream data and stream clock, and also, audio corresponding to the video is output. Thus, the video and audio generated in the DP source device 2 are reproduced in the DP sink device 5.

As described above, the mapper 31 of the source-side USB port 3 converts DP Link Symbols into a USB3.1 ESS Gen 2 BR 132-bit Data Block. The mapper 31 packs all the 9-bit DP Link Symbols into a 132-bit Data Block before scrambling. Fourteen of the 9-bit DP Link Symbols, totaling 126 bits, are packed into a 132-bit Data Block immediately following 4-bit Block Header and two unused bits before scrambling. This packing method (conversion method) is agnostic to:

Types of DP Link Symbols; either Control Link Symbols or Data Link Symbols

Whether the DP Link Symbols are for a stuffing purpose or not,

DP transport format; either SST (Single-Stream Transport) or MST (Multi-Stream Transport).

The data block generated in the mapper 31 consists of only Control Link Symbols, only Data Link Symbols, or Control Link Symbols and Data Link Symbols.

In the event there are no DP Link Symbols available to transmit in the 132-bit Data Block, that is, in the event there are not 14 DP Link Symbols, the mapper 31 generates DP tunneling dummy link symbols in the generator 310 and uses them in place of missing DP Link Symbols to generate a 132-bit Data Block. The generator 310 generates, as a DP tunneling dummy link symbol, a special 9-bit value that has the Control/Data Link Symbol identification bit set to 1 that is not used at ANSI 8b/10b. The special 9-bit value that has the Control/Data Link Symbol identification bit set to 1 that is not used at ANSI 8b/10b is a control symbol to which no ANSI 8b/10b special code is allocated. In DP Standard Version 1.3, there are 256 Control Link Symbols, and ANSI 8b/10b defines only 12 Special Character Symbol Codes. It can be said that in the event there are not 14 DP Link Symbols, the generator 310 converts a plurality of DP Link Symbols containing Control Link Symbols to which no ANSI 8b/10b special codes are allocated into a 132-bit Data Block. The DP tunneling dummy link symbols are distinguished from DP Dummy Link Symbols generated by the DPTX link layer 21.

The transmission of the 132-bit Control Blocks, such as SKP Ordered Set and SYNC Ordered Set, for link management by the USB3.1 ESS port (source-side USB port 3) has the higher priority than that of the 132-bit Data Blocks containing DP Link Symbols.

The resulting 128b/132b-coded serial bit stream transmitted over the USB3.1 ESS link 120 (the serial bit stream transmitted from the source-side USB port 3 to the sink-side USB port 4) is to consist of 132-bit Data Blocks containing 9-bit DP Link Symbols (either Valid or Reversed) and 132-bit Control Blocks inserted as per USB3.1 ESS link management requirement. The valid DP Link Symbols are the DP Link Symbols generated by the DPTX link layer 21, and the Reversed DP Link Symbols are the DP tunneling dummy link symbols generated by the generator 310.

The over-subscription of the link bandwidth (that is, the peak bandwidth of an AV stream to be transported exceeding the available USB3.1 ESS link bandwidth) is to be avoided through the use of the link bandwidth over-subscription prevention methods defined in DP Standard Version 1.3.

The presence of the DP Link Symbol-to-132b data block mapper 31 (DP1.3 link symbol-128b/132b converter) and the 132b data block-to-DP link symbol mapper 41 (128b/132b-DP1.3 link symbol converter) enables the DP source device 2 and the DP sink device 5 each equipped with a 128b/132b-coded USB3.1 ESS Gen 2 BR PHY layer at 10 Gbps/lane.

Figure 6:
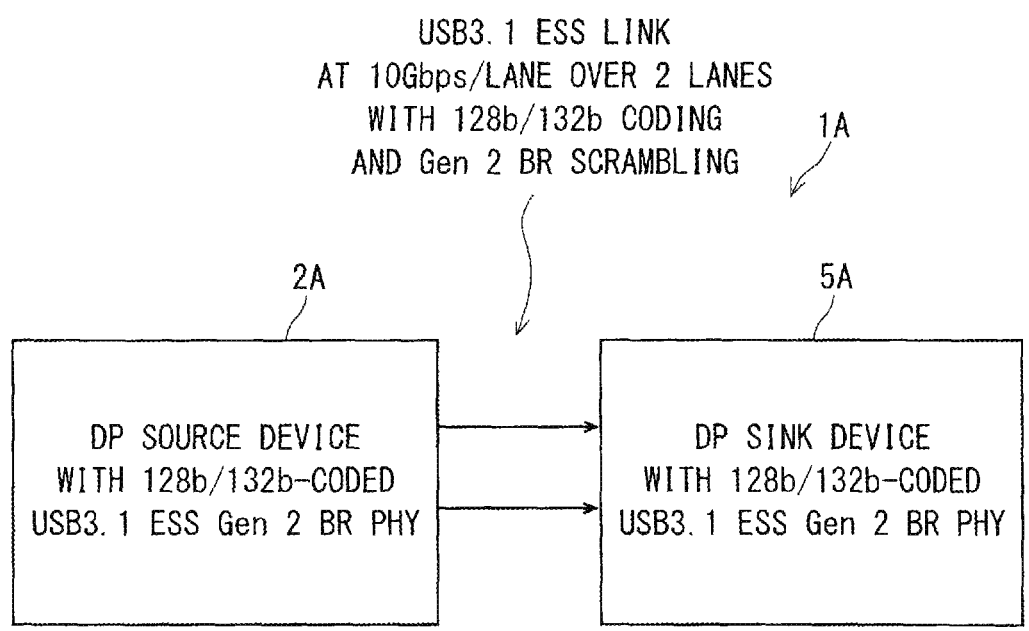
FIG. 6 illustrates the configuration of another image display system.

FIG. 6 illustrates an image display system 1A including a DP source device 2A and a DP sink device 5A each including a 128b/132b-coded USB3.1 ESS Gen 2 BR PHY layer. The DP source device 2A is provided with the configuration of part of the source-side USB port 3. The DP sink device 5A is provided with the configuration of part of the sink-side USB port 4.

Figure 7:
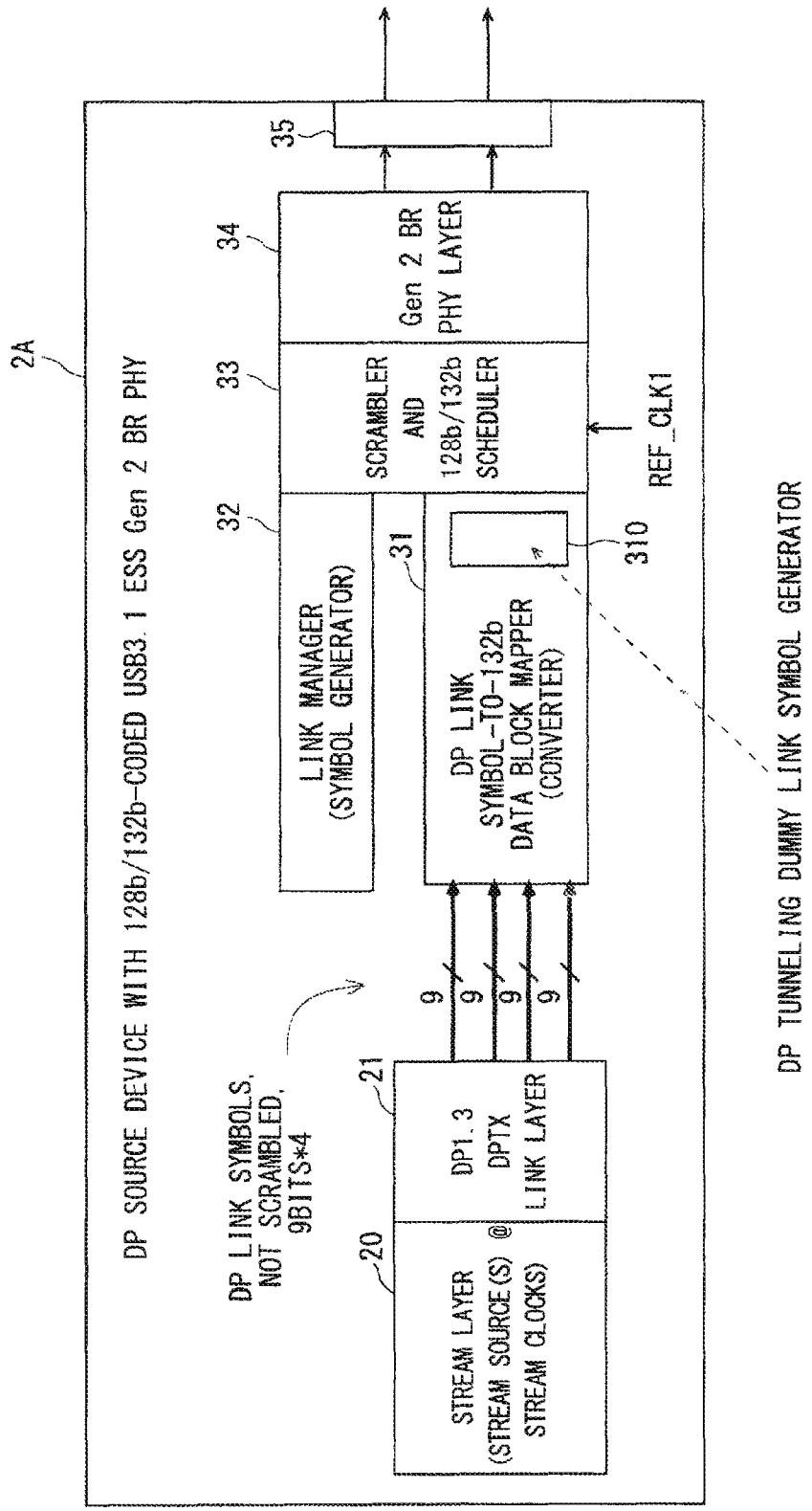
FIG. 7 illustrates the configuration of another DP source device.

FIG. 7 illustrates the configuration of the DP source device 2A. As illustrated in FIG. 7, the DP source device 2A includes the stream layer 20 and the DPTX link layer 21 of the DP source device 2. The DP source device 2A further includes the mapper 31, the link manager 32, the scrambler and 128b/132b scheduler 33, the Gen 2 BR PHY layer 34, and the connector 35 of the source-side USB port 3.

In the DP source device 2A, the DP Link Symbols generated in the DPTX link layer 21 are input to the mapper 31 via four lanes. The DP Link Symbols input to the mapper 31 are not scrambled. The mapper 31 converts a plurality of input DP Link Symbols into a data block. Then, the Gen 2 BR PHY layer 34 differentially transmits the data block and the control block to the DP sink device 5A via the connector 35.

Figure 8:
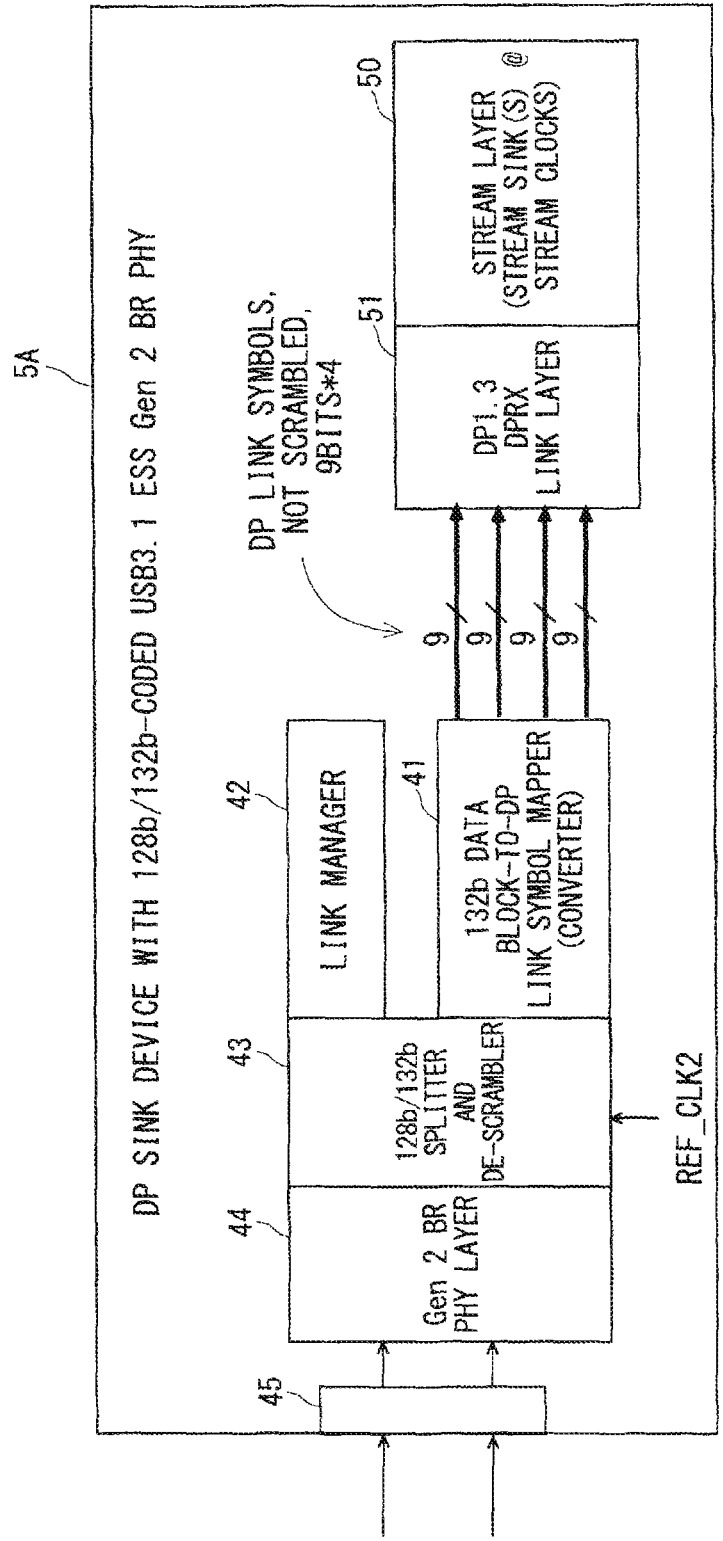
FIG. 8 illustrates the configuration of another DP sink device.

FIG. 8 illustrates the configuration of the DP sink device 5A. As illustrated in FIG. 8, the DP sink device 5A includes the stream layer 50 and the DPRX link layer 51 of the DP sink device 5. The DP sink device 5A further includes the mapper 41, the link manager 42, the 128b/132b splitter and de-scrambler 43, the Gen 2 BR PHY layer 44, and the connector 45 of the sink-side USB port 4.

In the DP sink device 5A, the Gen 2 BR PHY layer 44 differentially receives the 132-bit block from the DP source device 2A via the connector 45. The DP Link Symbols generated by the mapper 41 are input to the DPRX link layer 51 via four lanes. The DP Link Symbols input to the DPRX link layer 51 are not scrambled. Then, in the stream layer 50, the original AV stream data generated in the DP source device 2A is reproduced.

The DP source device 2A and the DP sink device 5A are separate from each other. The connector 35 of the DP source device 2A and the connector 45 of the DP sink device 5A are connected via a USB Type-C connector cable.

Figure 9:
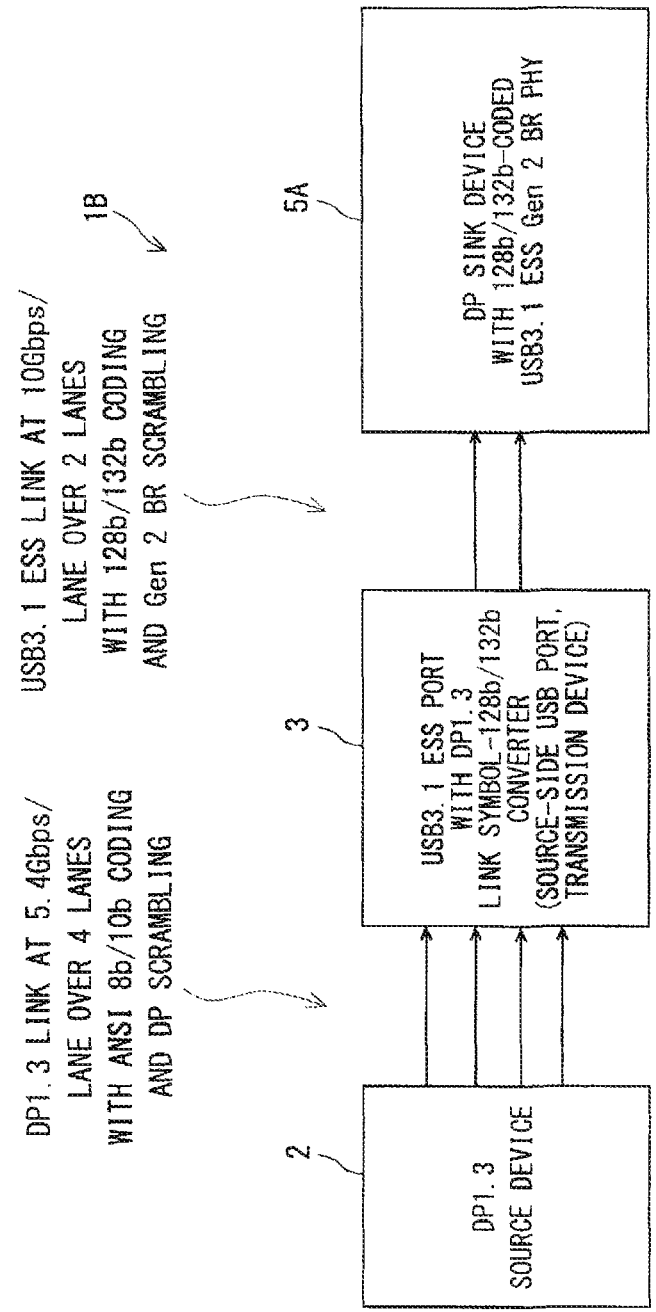
FIG. 9 illustrates the configuration of still another image display system.
Figure 10:
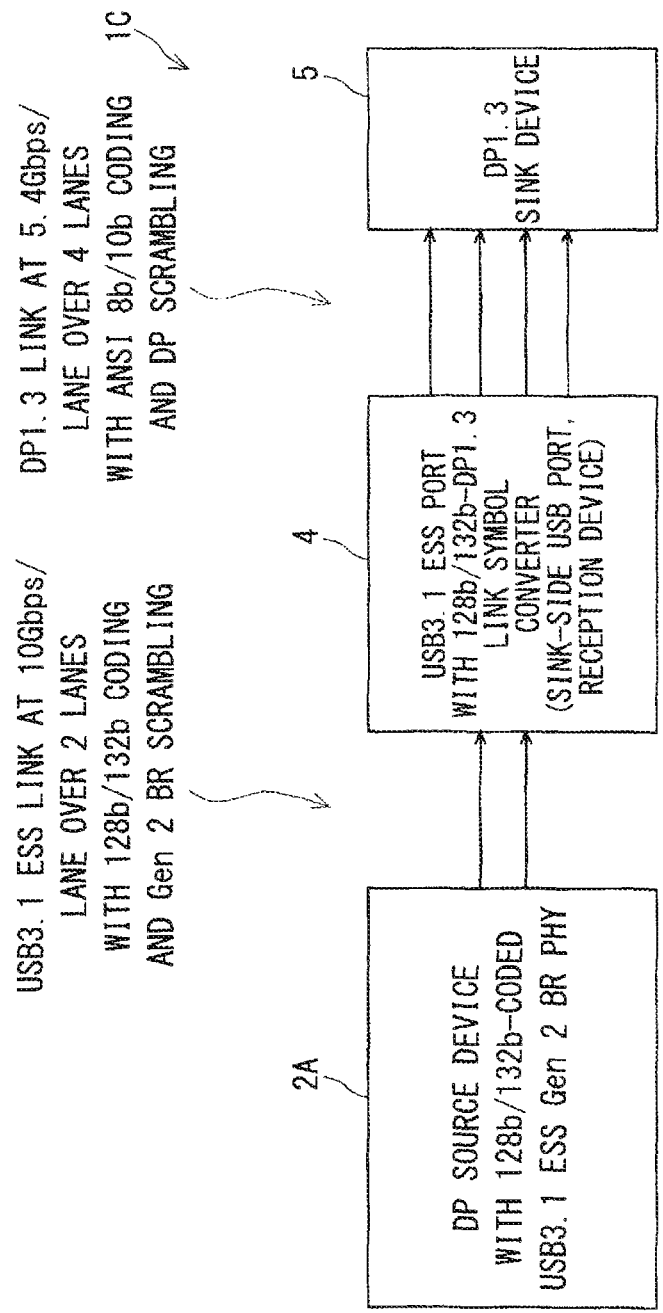
FIG. 10 illustrates the configuration of still another image display system.

As in an image display system 1B illustrated in FIG. 9, the source-side USB port 3 connected to the DP source device 2 and the DP sink device 5A may be connected via a USB Type-C connector cable. Alternatively, as in an image display system 1C illustrated in FIG. 10, the DP source device 2A and the sink-side USB port 4 connected to the DP sink device 5 may be connected via a USB Type-C connector cable.

This embodiment enables the tunneling of DP protocol over the 128b/132b-coded USB3.1 ESS Gen 2 BR PHY layer at 10G bps per lane, instead of repurposing some signal pins from USB3.1 ESS PHY signaling to DP1.3 PHY signaling as described in Non-Patent Document 3. In this embodiment, the tunneling of DP protocol is agnostic to DP transport formats (SST or MST) and DP1.3 link rates (1.62-/2.7-/5.4-/8.1-Gbps per lane).

This embodiment is also applicable to the USB3.1 ESS link having Gen 2 PHY re-timers between two USB3.1 ESS ports. Besides, this embodiment is applicable to 128b/132b-coded PHY layers at other bit rates that may be defined in the future version of USB specifications and 128b/130b-coded PHY layers.

As for DP and USB3.1 ESS Gen2 PHY link configurations, the Gen2 PHY link lane count is set via USB PD communications as per USB specification convention while DP link count is set via AUX transactions as per DP1.3 Standard convention. The AUX transactions for DP link configuration ensure that DFP_D (Downstream Facing Port DP) Main Link lane count and link rate match those of UFP_D (Upstream Facing Port DP) Main Link.

Figure 11:
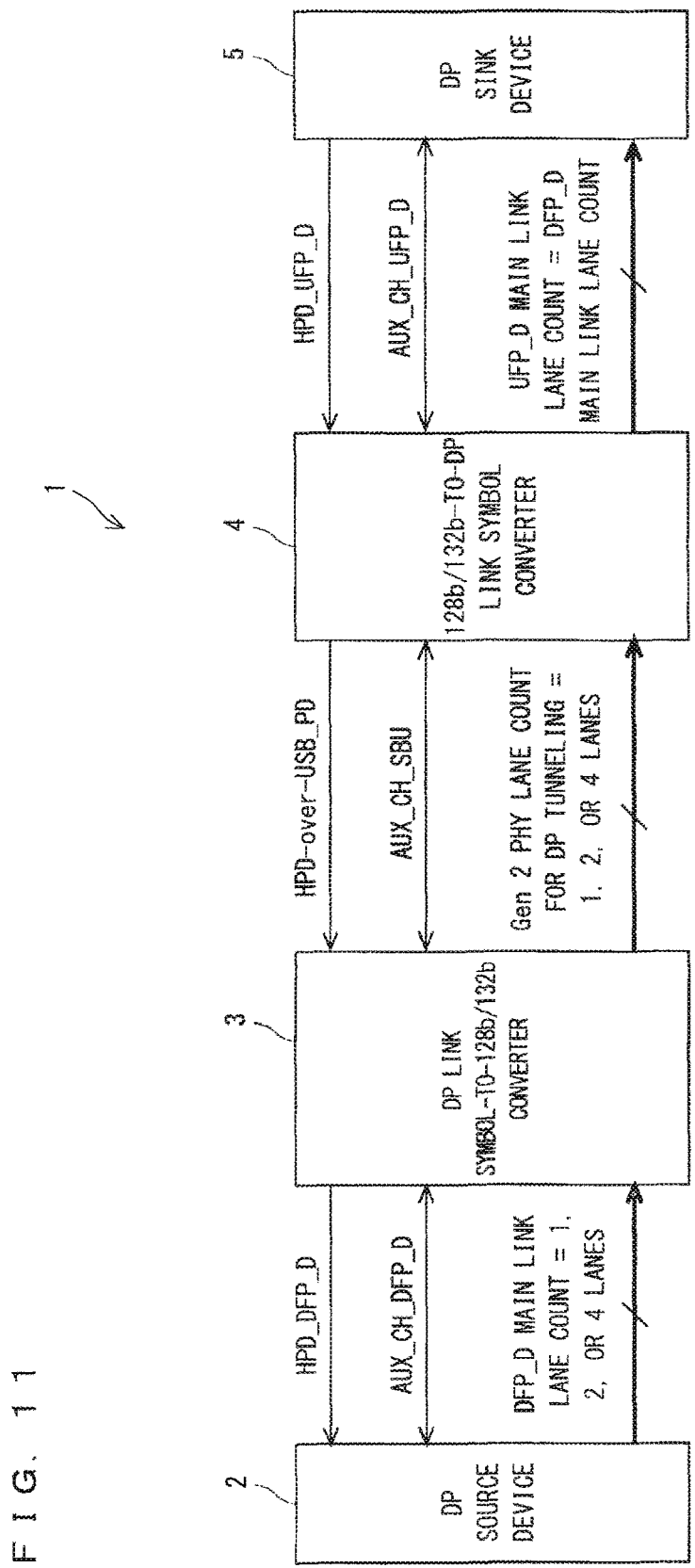
FIG. 11 illustrates the configuration of the image display system.

FIG. 11 illustrates the image display system 1 of FIG. 1 to which AUX CH and HPD (Hot Plug Detection) of DP are added. In FIG. 11, the USB3.1 ESS port 3 (source-side USB port 3) with a DP1.3 link symbol-128b/132b converter is represented by a "DP link symbol-to-128b/132b converter," and the USB3.1 ESS port 4 (sink-side USB port 4) with a 128b/132b-DPI.3 link symbol converter is represented by a "128b/132b-to-DP link symbol converter."

AUX transactions are exchanged between the DP source device 2 and the source-side USB port 3 over AUX_CH_DFP_D as per DP1.3 Standard convention. As a result, the lane count of the main link between the DP source device 2 and the source-side USB port 3 is set to any one of 1, 2, and 4. In the example of FIG. 1, the lane count of the main link is set to 4. Besides, between the DP source device 2 and the source-side USB port 3, HPD (HPD_ DFP_D in FIG. 11) takes place as per DP1.3 Standard convention.

As described in Non-Patent Document 3, AUX transactions are exchanged between the source-side USB port 3 and the sink-side USB port 4 via the SBU of the USB Type-C connector (AUX_CH_SBU in FIG. 11). As described in Non-Patent Document 3, HPD takes place between the source-side USB port 3 and the sink-side USB port 4 via the USB PD of the USB Type-C connector (HPD-over-USB_PD in FIG. 11). USB PD communication takes place between the source-side USB port 3 and the sink-side USB port 4 as per USB specification convention, and accordingly, the lane count at which DP Link Symbols are transported is set to any one of 1, 2, and 4. In the example of FIG. 1, the lane count is set to 2.

AUX transactions are exchanged between the sink-side USB port 4 and the DP sink device 5 via AUX_CH_UFP_D as per DP1.3 Standard convention. The lane count of the main link between the sink-side USB port 4 and the DP sink device 5 matches the lane count of the main link between the DP source device 2 and the source-side USB port 3. Besides, HPD (HPD_UFP_D in FIG. 11) takes place between the sink-side USB port 4 and the DP sink device 5 as per DP1.3 Standard convention.

Figure 12:
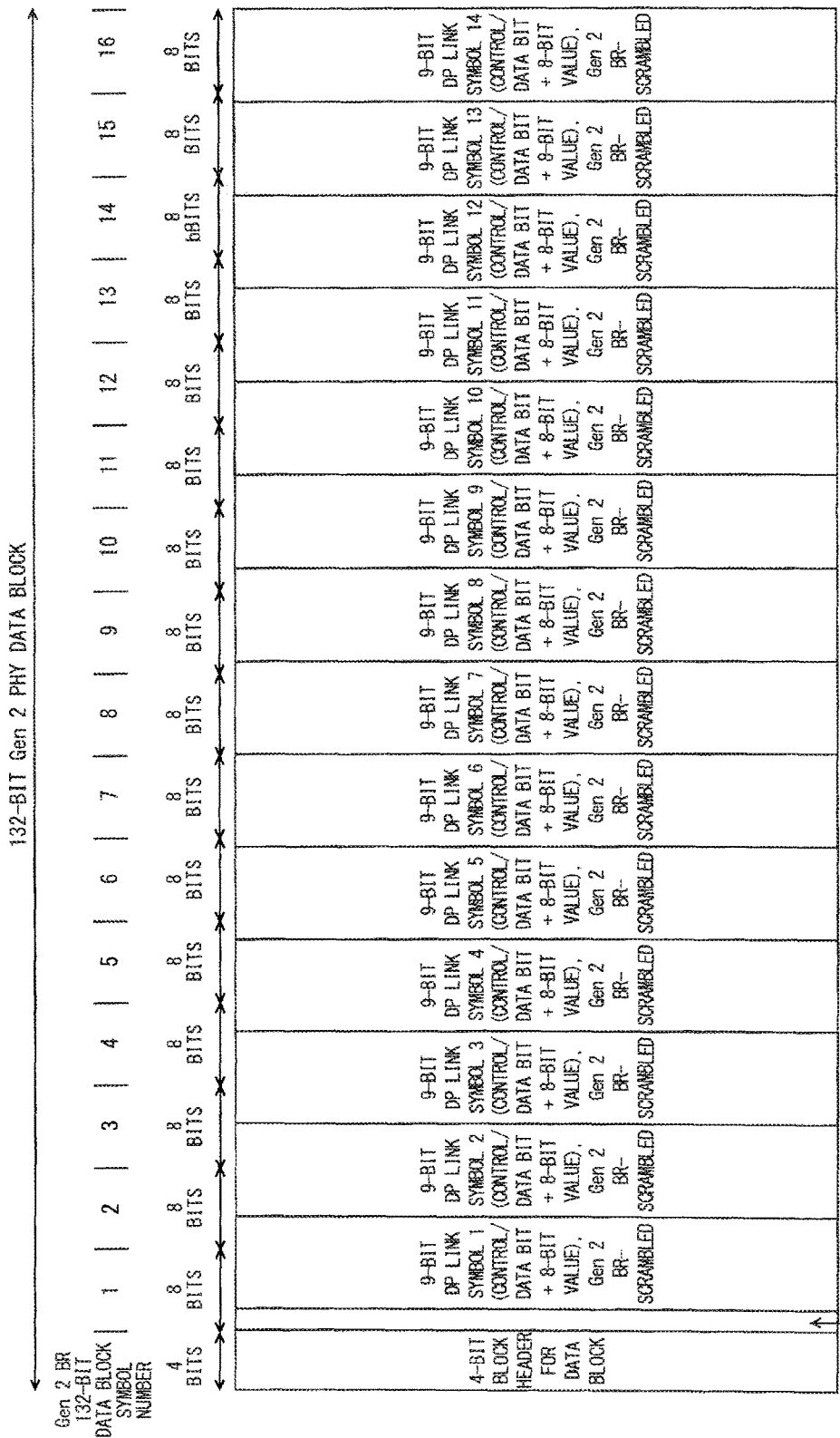
FIG. 12 illustrates the configuration of a 132-bit Data Block.

FIG. 12 illustrates a 132-bit Data Block containing a plurality of DP Link Symbols. DP Link Symbol is 9 bits, consisting of an 8-bit value and a Control/Data Link Symbol identification bit (Control/Data bit in FIG. 12).

The mapper 31 packs fourteen of the 9-bit DP Link Symbols totaling 126 bits into 132-bit Data Block before scrambling immediately following the 4-bit Block Header and 2 unused bits. The 132-bit Data Block is scrambled for 8-bit symbols.

In the event DP Link Symbols are packed into a data block, as described above, the mapper 31 may generate DP tunneling dummy link symbols in the generator 310. The DP tunneling dummy link symbols are contained in the 132-bit Data Block.

Lane mapping by the mapper 31 is agnostic to the lane counts of DP Main Link and Gen2 BR PHY Link. FIGS. 13 to 15 each illustrate the relationship between the DP Link Symbols transported over the DP Main Link and the DP Link Symbols transported over the Gen2 BR PHY link. FIG. 13 illustrates the relationship in the case where both of the lane counts of the DP Main Link and the Gen2 BR PHY link are 4. FIG. 14 illustrates the relationship in the case where both of the lane counts of the DP Main Link and the Gen2 BR PHY link are 2. FIG. 15 illustrates the relationship in the case where both of the lane counts of the DP Main Link and the Gen2 BR PHY link are 1. In FIGS. 13 to 15, Lx and DP_LSy ($1 \leq x \leq 4$, $1 \leq y \leq 4$) respectively represent a lane x and a DP Link Symbol y. Therefore. Lx_DP_LSy represents a DP Link Symbol y in a DP lane x.

In the example of FIG. 13, for example, the DP Link Symbols 1, 2, and 3 of the DP lane 0 are transported respectively as DP Link Symbols 1, 5, and 9 on the Gen2 BR PHY lane 0. In the example of FIG. 14, for example, the DP Link Symbols 1, 2, and 3 of the DP lane 0 are transported respectively as the DP Link Symbols 1, 3, and 5 on the Gen2 BR PHY lane 0. In the example of FIG. 15, for example, the DP Link Symbols 1, 2, and 3 of the DP lane 0 are transported respectively as the DP Link Symbols 1, 2, and 3 on the Gen2 BR PHY lane 0.

The mapper 41 pairing with the mapper 31 extracts the 9-bit DP Link Symbols from the 132-bit Data Block and outputs the extracted 9-bit DP Link Symbols. If the 132-bit Data Block contains DP tunneling dummy link symbols, the mapper 41 discards the DP tunneling dummy link symbols.

It is the responsibility of the mapper 41 to evenly distribute DP Link Symbols corresponding to AV stream data into DP Micro-Packets (that is, TU or Transfer Unit, for SST transport format, and MTP, for Multi-stream Transport Packet, for MST transport format) as defined in DP1.3 Standard.

The DP link bandwidth between the DP source device 2 and the source-side USB port 3 is greater than the USB3.1 ESS link bandwidth. The over-subscription of the link bandwidth (that is, the peak bandwidth of a transport AV stream is greater than the available USB3.1 ESS link bandwidth) is restricted as follows:

With DP MST transport format: The DP source device 2 obtains the available bandwidth of the link to a target DP sink device 5 via ENUM PATH RESOURCES message transaction; and With DP SST (Single-Stream Transport) format: The DP source device 2 obtains the maximum transmittable pixel rate and pixel bit depth through DPCD registers at DPCD Addresses 00080h to 00083h that describe the downstream-facing port capability of DP Branch devices as described in DP1.3 Standard.

The mapper 31 can be provided in a DP Branch device with downstream-facing DP++ port.

Fourteen of DP Link Symbols are packed into a 132-bit Data Block, and a DP Link Symbol contains 8-bit data. In this embodiment, the coding efficiency of the DP tunneling over USB3.1 ESS Gen 2 BR PHY layer is:

Data Block Coding Efficiency=14*8 bits/132 bits=84.8%

The transport overhead due to the transmission of Control Blocks is to be conservatively approximated as 3%, resulting in the Link Layer coding efficiency of:

Link Layer Coding Efficiency=84.8%*(100−3)/100=82.2%

The PHY Layer coding efficiency is bound to be lower than the link layer coding efficiency, depending on the PHY-level forward error correction (FEC) method used for data integrity improvement. Assuming the FEC overhead of 2.5%, the PHY Layer coding efficiency is:

PHY Layer Coding Efficiency=82.2%*(100−2.5)/100=80.2%

The raw serial bit rate in the unit of Gbps is converted to an available bandwidth (that is, excluding the coding overhead) in the unit of Mbytes/sec as follows:

1 Gbps*80% coding efficiency=0.8 Gbps=100 Mbytes/sec

The available bandwidth of DP Link Symbols tunneled over USB3.1 ESS Gen 2 BR PHY layer at 2 lanes, therefore, is:

10*100 Mbytes/sec/lane*2 lanes/link=2000 Mbytes/sec/link

For a video pixel stream of 30 bits per pixel (that is, 3.75 bytes per pixel), the maximum pixel rate is:

Maximum pixel rate at 30 bits per pixel
=2000 Mbytes per sec per link/3.75 bytes per pixel
=533 Mpixels/sec As a reference, the pixel rate of 533 Mpixels/sec corresponds to that of 4K2K progressive video at 60 frames per sec with VESA Coordinated Video Timing (CVT) Ver.1.2 reduced blanking timing, which is defined in Non-Patent Document 4.

While the image display system has been described above in detail, the foregoing description is in all aspects illustrative and not restrictive. The above-mentioned various modifications may be used in combination unless any contradiction occurs. It is understood that numerous modifications that have not been described can be devised without departing from the scope of the present invention.

REFERENCE SIGNS LIST 2, 2A DP source device
3 source-side USB port (transmission device)
4 sink-side USB port (reception device)
5, 5A DP sink device
21 DPTX link layer
31, 41 mapper
33 scrambler and 128b/132b scheduler
34, 44 Gen 2 BR PHY layer
43 128b/132b splitter and de-scrambler
51 DPRX link layer

The invention claimed is:

1. A transmission device comprising:
    circuitry configured to
        convert a plurality of link symbols containing a control symbol to which no ANSI 8b/10b special code is allocated in DisplayPort (DP) into a data block in Gen 2 in Universal Serial Bus (USB); and
        transmit the data block to a reception device configured to convert the data block to the plurality of link symbols.

2. The transmission device according to claim 1, wherein the circuitry is configured to:
    scramble the data block; and
    transmit the scrambled data block to the reception device.

3. A DisplayPort (DP) source device comprising:
    circuitry configured to
        map stream data to a plurality of link symbols containing a control symbol to which no ANSI 8b/10b special code is allocated in DisplayPort (DP);
        convert the plurality of link symbols into a data block in Gen 2 in Universal Serial Bus (USB); and
        transmit the data block to a DisplayPort (DP) sink device configured to convert the data block to the plurality of link symbols.

4. A reception device comprising:
    circuitry configured to
        receive, from a transmission device, a data block obtained as a data block in Gen 2 in Universal Serial Bus (USB) by conversion, by the transmission device, from a plurality of link symbols containing a control symbol to which no ANSI 8b/10b special code is allocated in DisplayPort (DP); and
        convert the received data block into the plurality of link symbols.

5. The reception device according to claim 4, wherein the circuitry is configured to:
    de-scramble the received data block; and
    convert the de-scrambled received data block into the plurality of link symbols.

6. A DisplayPort (DP) sink device comprising:
    circuitry configured to
        receive, from a DisplayPort (DP) source device, a data block obtained as a data block in Gen 2 in Universal Serial Bus (USB) by conversion, by the DisplayPort (DP) source device, from a plurality of link symbols containing a control symbol to which no ANSI 8b/10b special code is allocated in DisplayPort (DP);
        convert the received data block into the plurality of link symbols; and
        map the plurality of link symbols converted from the received data block to stream data.

7. The reception device according to claim 5, wherein the circuitry is configured to discard the control symbol from the plurality of link symbols when converting the de-scrambled received data block into the plurality of link symbols.

8. The DIP sink device according to claim 6, wherein the circuitry is configured to discard the control symbol from the plurality of link symbols when mapping the plurality of link symbols to the stream data.

* * * * *